(12) United States Patent
Sender (10) Patent No.: US 11,047,677 B2
(45) Date of Patent: Jun. 29, 2021

(54) X-RAY BASED METROLOGY OF A HIGH ASPECT RATIO HOLE

(71) Applicant: APPLIED MATERIALS ISRAEL LTD., Rehovot (IL)

(72) Inventor: Benzion Sender, Modiin-Macabim-Reut (IL)

(73) Assignee: APPLIED MATERIALS ISRAEL LTD., Rehovot (IL)

(*) Notice: Subject to any disclaimer, the term of this patent is extended or adjusted under 35 U.S.C. 154(b) by 0 days.

(21) Appl. No.: 16/692,949

(22) Filed: Nov. 22, 2019

(65) Prior Publication Data

US 2021/0156682 A1    May 27, 2021

(51) Int. Cl.
*G01B 15/00*    (2006.01)

(52) U.S. Cl.
CPC .................... *G01B 15/00* (2013.01)

(58) Field of Classification Search
CPC ..................................................... G01B 15/00
USPC ........ 250/306, 307, 310, 311; 378/113, 124, 378/44, 45, 46, 48, 50, 83
See application file for complete search history.

(56) References Cited

U.S. PATENT DOCUMENTS 9,805,909 B1* 10/2017 Shemesh ................. H01J 37/28

* cited by examiner

*Primary Examiner* — Michael Maskell
(74) *Attorney, Agent, or Firm* — Kilpatrick Townsend & Stockton LLP (57) ABSTRACT

A method that includes performing multiple test iterations to provide multiple test results; and processing the multiple test results to provide estimates of a conductivity of each of the multiple bottoms segments. The multiple test iterations includes repeating, for each bottom segment of the multiple bottom segments, the steps of: (a) illuminating the bottom segment by a charging electron beam; wherein electrons emitted from the bottom segment due to the illuminating are prevented from exiting the hole; (b) irradiating, by a probing electron beam, an area of an upper surface of the dielectric medium; (c) collecting electrons emitted from the area of the upper surface as a result of the irradiation of the area by the probing electron beam to provide collected electrons; and (d) determining an energy of at least one of the collected electrons to provide a test result.

12 Claims, 11 Drawing Sheets

X-RAY BASED METROLOGY OF A HIGH ASPECT RATIO HOLE

BACKGROUND OF THE INVENTION

Three dimensional NAND flash memories represent an architectural change in the flash memory manufacturing technology. Stacking the memory cells vertically forms a high aspect ratio architectures such as deep trenches or holes. Shape and material characterization of these structures pose a challenge for metrology and inspection for the manufacturing process.

Three dimensional NAND flesh memories are only a non-limiting example of a technology that forms high aspect ratio pattern architectures. An aspect ratio equals the depth of the hole divided by the diameter of the hole. For example—a high aspect ratio hole may exhibit an aspect ratio that may exceed ten.

When irradiating a bottom of a high aspect ratio hole with an electron beam, secondary electrons that are generated as a result of the irradiation do not exit the high aspect ratio hole and are not detected by a secondary electron detector.

EDX photons generated by electron beam irradiation, projects a measurable image from a high aspect ratio pattern architectures. The image projects information of the actual pattern morphology, based on material separation. The EDX image is measured to characterize various aspects such as physical dimensions (CD), local or global variation from a simulated architecture (defectivity), the physical location of a pattern relative to other parts of the physical architecture (overlay).

There is a growing need in the semiconductor industry to provide systems and methods that can image and characterize high aspect ratio architectures.

BRIEF SUMMARY OF THE INVENTION

According to an embodiment of the invention there may be provided a method for evaluating a bottom of hole formed in a medium, the method may include irradiating the bottom of the hole with a charged particle beam that propagates along an optical axis; detecting, by an energy dispersive X-ray (EDX) detector, emitted x-ray photons that may be emitted, as result of the irradiating the bottom of the hole, from the bottom of the hole within an angular range that exceeds ten degrees; generating, by the EDX detector, detection signals indicative of the emitted x-ray photons; and processing the detection signals to provide an estimate of the bottom of the hole.

The irradiating of the bottom of the hole may include directing the charged particle beam through a charged particle beam optics tip and through an aperture of tip of the EDX detector.

The irradiating of the bottom of the hole may include irradiating at least a majority of the bottom of the hole.

The irradiating of the bottom of the hole may include scanning at least a majority of the bottom of the hole with the charged particle beam.

The irradiating of the bottom of the hole may include irradiating a fraction of the bottom of the hole.

The method according to claim 1 may include repeating for each hole of a group of holes that may be formed in the medium the steps of irradiating only a fraction of the bottom of the hole.

When operating in a first operational mode then scanning at least a majority of the bottom of the hole with the charged particle beam and wherein when operating in a second operational mode the irradiating only a fraction of the bottom of the hole.

The angular range may or may not be centered about the optical axis.

According to an embodiment of the invention there may be provided a system for evaluating a bottom of a hole formed in a medium, wherein the system may include charged particle optics that may be configured to irradiate the bottom of the hole with a charged particle beam that propagates along an optical axis; an energy dispersive X-ray (EDX) detector that may be configured to detect emitted x-ray photons that may be emitted from the bottom of the hole within an angular range that exceeds ten degrees and to generate detection signals indicative of the emitted x-ray photons; and a processor that may be configured to process the detection signals to provide an estimate of the bottom of the hole.

The charged particle optics may be configured to irradiate the bottom of the hole by directing the charged particle beam through a charged particle beam optics tip and through an aperture of tip of the EDX detector.

The charged particle optics may be configured to irradiate at least a majority of the bottom of the hole.

The charged particle optics may be configured to scan at least a majority of the bottom of the hole with the charged particle beam.

The charged particle optics may be configured to irradiate a fraction of the bottom of the hole.

The charged particle optics may be configured to irradiate, for each hole of a group of holes that may be formed in the medium, only a fraction of the bottom of the hole.

The charged particle optics may be configured to scan, when operating in a first operational mode, at least a majority of the bottom of the hole with the charged particle beam; and wherein the charged particle optics may be configured to irradiate, when operating in a second operational mode, only a fraction of the bottom of the hole.

The angular range may or may not be centered about the optical axis.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

In the following text the term "hole" means a high aspect ratio hole or any other high aspect ratio pattern. A hole may be a trench, a circular and/or rectangular shaped hole, and the like.

Figure 1:
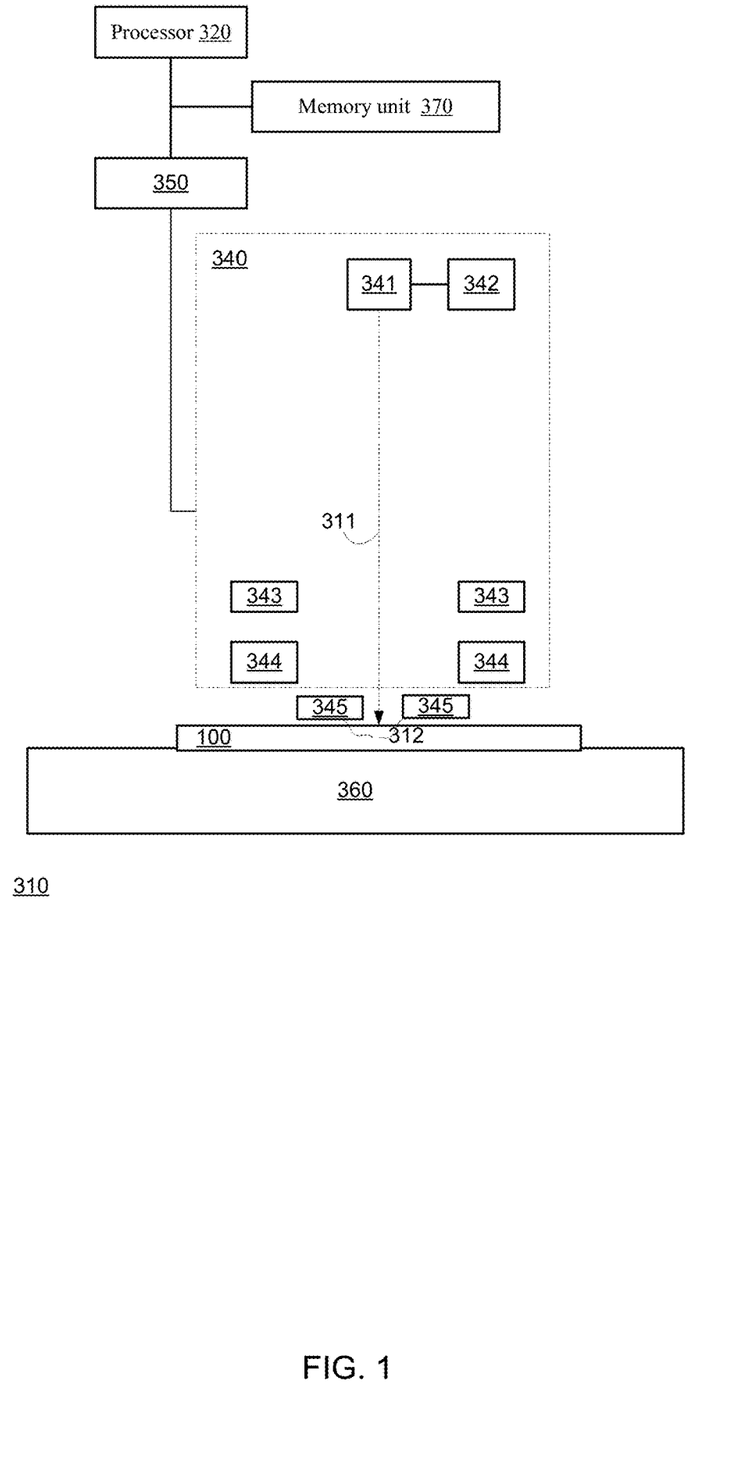
FIG. 1 illustrates a system according to an embodiment of the invention.

FIG. 1 illustrates charged particle beam system 310 and a substrate 100 according to an embodiment of the invention.

Charged particle beam system 310 includes a processor 320, a memory unit 370, a controller 350, an image acquisition module 340 and a mechanical stage 360.

Mechanical stage 360 is configured to move the substrate 100 in relation to the image acquisition module 340.

The image acquisition module 340 includes an electron source 341, a supply unit 342 for feeding the electron source 341, one or more electron optic components such as lenses 343 and 344 and energy dispersion x-ray (EDX) detector 345.

EDX detector 345 may be used for determining a composition of a microscopic element. An energy dispersion x-ray detector collects x-ray photons emitted as a result of an illumination of the microscopic element and generates an energy spectrum. Energy spectrum means any type of information about energy levels at different wavelengths or frequencies along the spectrum. For example—the energy spectrum can be a histogram that displays the number of X-ray counts for each x-ray energy level. Measuring X ray energies may help to characterize the element from which an x-ray photon was emitted.

The EDX detector 345 includes an energy analyzer for determining the energy of electrons that are detected by the detector.

Lenses 343 and 344 may be deflecting and/or focusing lenses, objective lenses or any other type of lenses. Lenses 343 and 344 may be magnetic lenses, electrostatic lenses or a combination of both electrical and magnetic lenses.

The image acquisition module 340 may have a field of view. The image acquisition module 340 may scan any point within the field of view without introducing a mechanical movement between the image acquisition module 340 and substrate 100.

When the charged particle beam system 310 operates in a first operational mode the charged particle beam system 310 scans the entire bottom of each hole of a group of holes—or at least a majority of the bottom of each hole of a group of holes.

According to an embodiment of the invention, lenses 344 are deflection lenses used for scanning the charge particle beam within a hole and lenses 343 are deflection lenses used for moving the charge particle beam between one hole of the group to another hole of the group.

When the charged particle beam system 310 operates in a second operational mode the charged particle beam system 310 may irradiate only a single bottom segment (even without scanning the entire bottom) and lenses 343 are used to move the charge particle beam between one hole of the group to another hole of the group. During the second operational mode the charged particle beam system 310 the EDX detector 345 may be used for determining a composition of the single bottom segment.

The second operational mode provides less information about the bottom of the hole but exhibits a much higher throughput than the first operational mode.

It should be noted that any number of bottom segments may be scanned. Thus, there may be other operational modes in which two or more bottom segments (but not the entire bottom segments) per hole are irradiated.

FIG. 1 illustrates a charged particle beam 311 that is not deflected before reaching lenses 343 and 344. It is noted that the charged particle beam 311 may be deflected once or twice before impinging on substrate 100. It is noted that the number of deflections can exceed two and that the amount.

In FIG. 1 x-ray photons 312 that are emitted from the substrate 100 are able to reach EDX detector 345.

The image acquisition module 340 may include more than a single detector.

Figure 2:
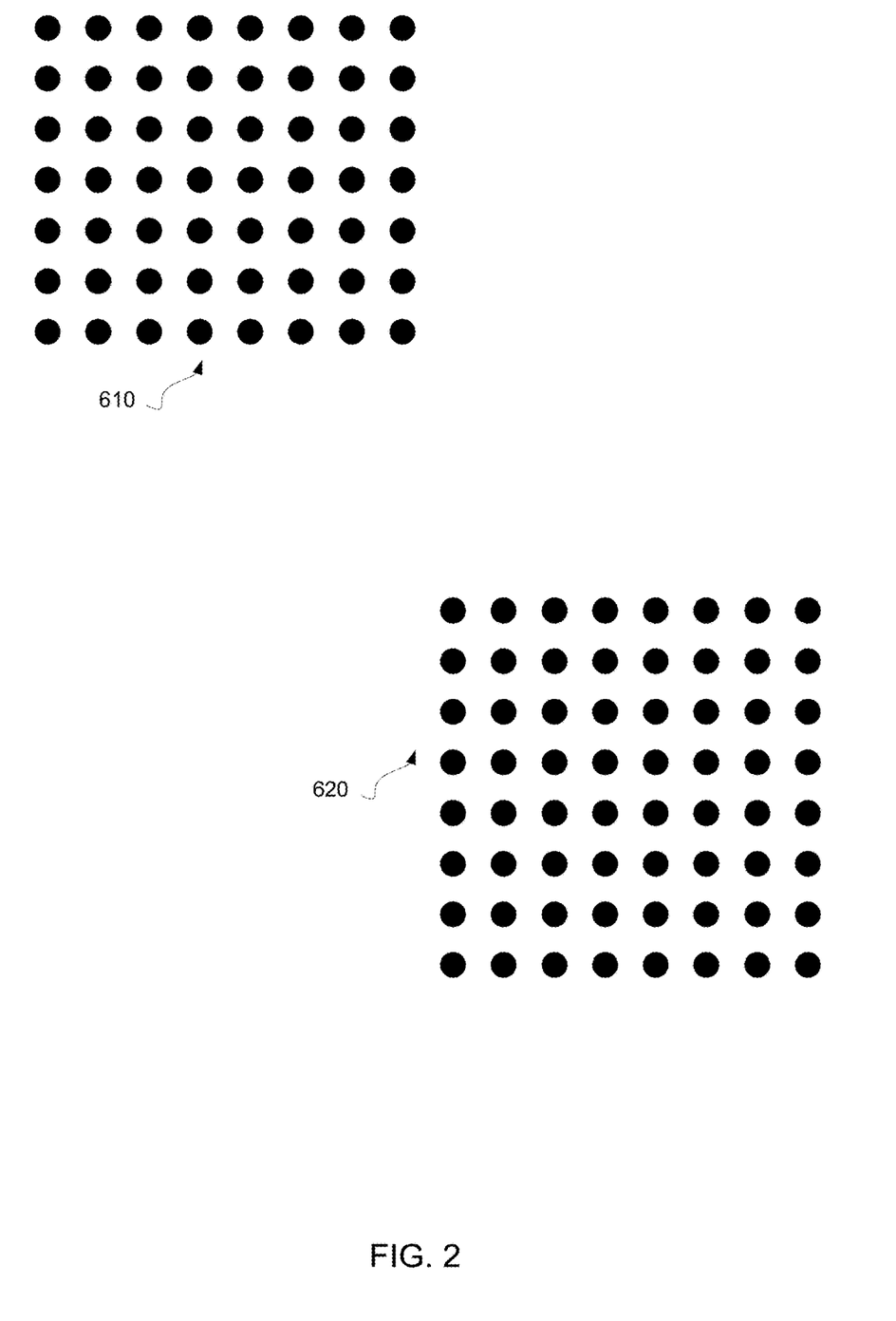
FIG. 2 illustrates two arrays of holes.

FIG. 2 illustrates two arrays of holes 610 and 620. These arrays are located at different field of view of the charged particle beam system 310 and a mechanical movement between the substrate 100 and the image acquisition module 340 should be introduced in order to image holes of these arrays. When the charged particle beam system 310 of FIG. 1 operates at the first operational mode and scan holes of the two arrays of holes 610 and 620 of figure then In FIG. 2 lenses 343 of charged particle beam system 310 operate as are deflection lenses that are used to move the charged particle beam between holes of an array and lenses 344 of charged particle beam system 310 are deflection lenses that are used to scan the bottom of the holes.

Figure 3:
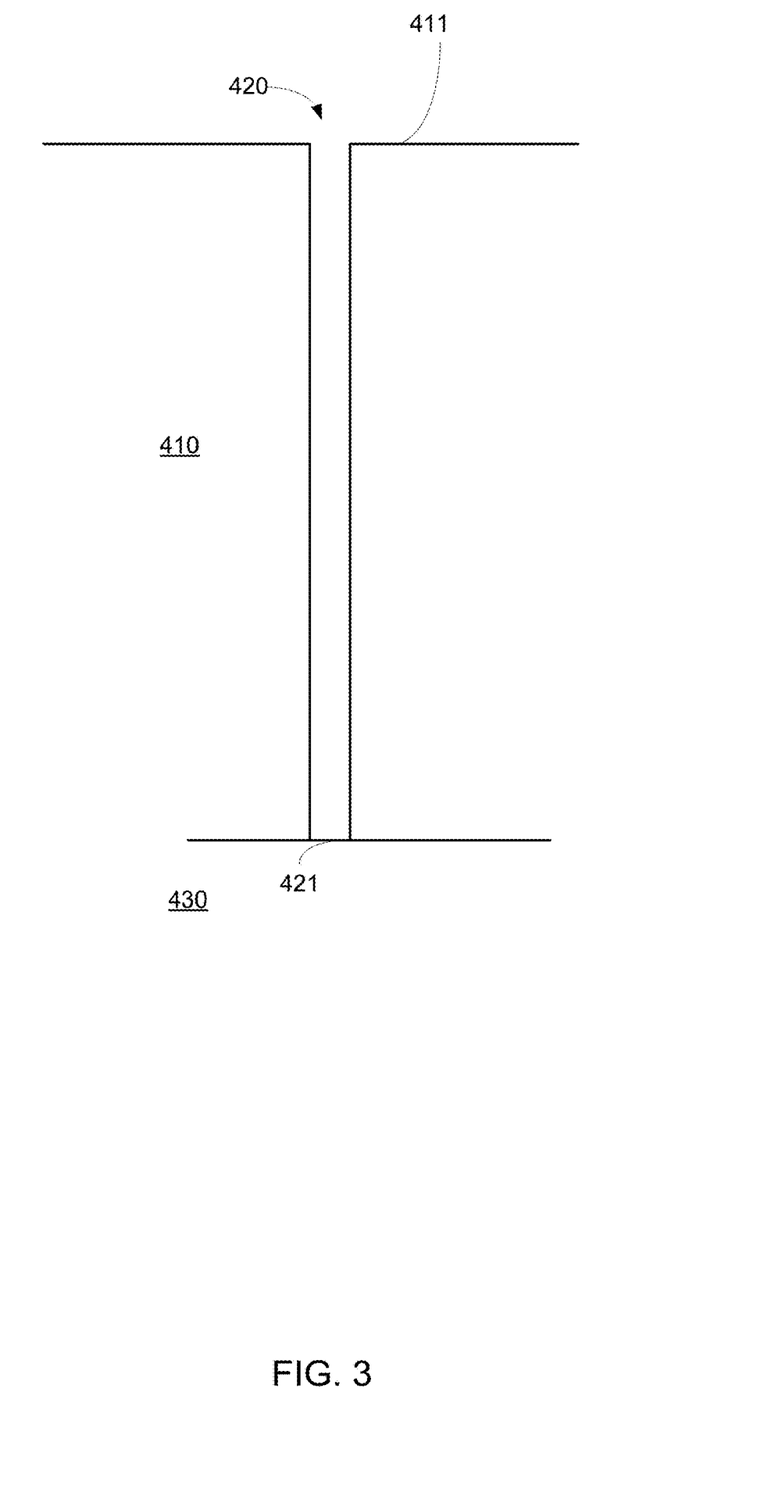
FIG. 3 illustrates a cross-sectional view of a high aspect ratio hole and its vicinity.

FIG. 3 is a cross sectional view of a hole 420 and its surroundings. Hole 420 is formed in a dielectric material 410. The dielectric material 410 has an upper surface 411 that surrounds the hole. In FIG. 3 the hole is deep enough to penetrate through the entire dielectric material 410 and expose (at the bottom 421 of the hole 420) another layer 430. It is noted that the other layer may be conductive layer or a non-conductive layer, that foreign particles or residual material may be positioned at the bottom 421 of the hole 420.

Non-limiting examples of the dimensions of the hole are listed below:
 a. Diameter may range between 10 nanometer and 1 micron.
 b. Depth may range between 100 nanometers and 10 microns.
 c. Aspect ratio of the hole (diameter divided by depth) may range between 1:10 and 1:100.
 d. The dielectric material can be made of materials such as but not limited to $SiO_2$ and $Si_3N_4$.

Substrate 100 can be made of materials such as but not limited to Tungsten (W) and Poly silicon.

A typical dies has a size that is smaller than one square centimeter and may include more than a thousand holes.

Figure 4:
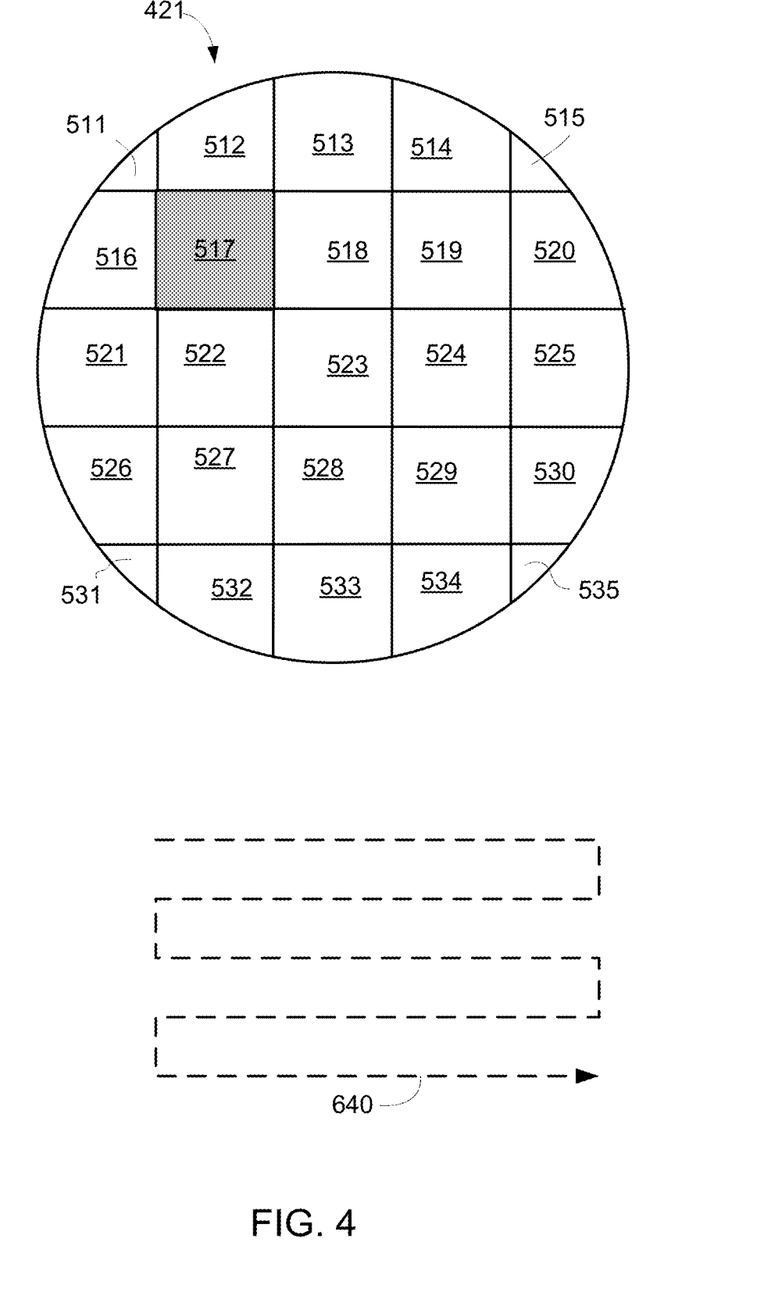
FIG. 4 illustrates an illumination of a bottom segment of a bottom of a hole by a charging electron beam according to an embodiment of the invention.

FIG. 4 illustrate twenty five bottom segments—that are denoted 511, 512, 513, 514, 515, 516, 517, 518, 519, 520, 521, 522, 523, 524, 525, 526, 527, 528, 529, 530, 531, 532, 533, 534 and 535 of a bottom 421 of a hole.

The number of bottom segments may differ from twenty five. The shape of the bottom segments may differ from those illustrated in FIG. 4.

FIG. 4 illustrates a raster scan pattern 640 for scanning the bottom segments 511-535 when the charged particle beam system operates at the first operational mode. The raster scan pattern is merely a non-limiting example of a scan pattern that may be used for scanning the bottom segments 511-535 and any other scan pattern may be applied. FIG. 4 illustrates a point in time during which bottom segment 517 is irradiated.

The cross section of the charged particle beam and accordingly the shape of the bottom segments may be non-rectangular.

Figure 5:
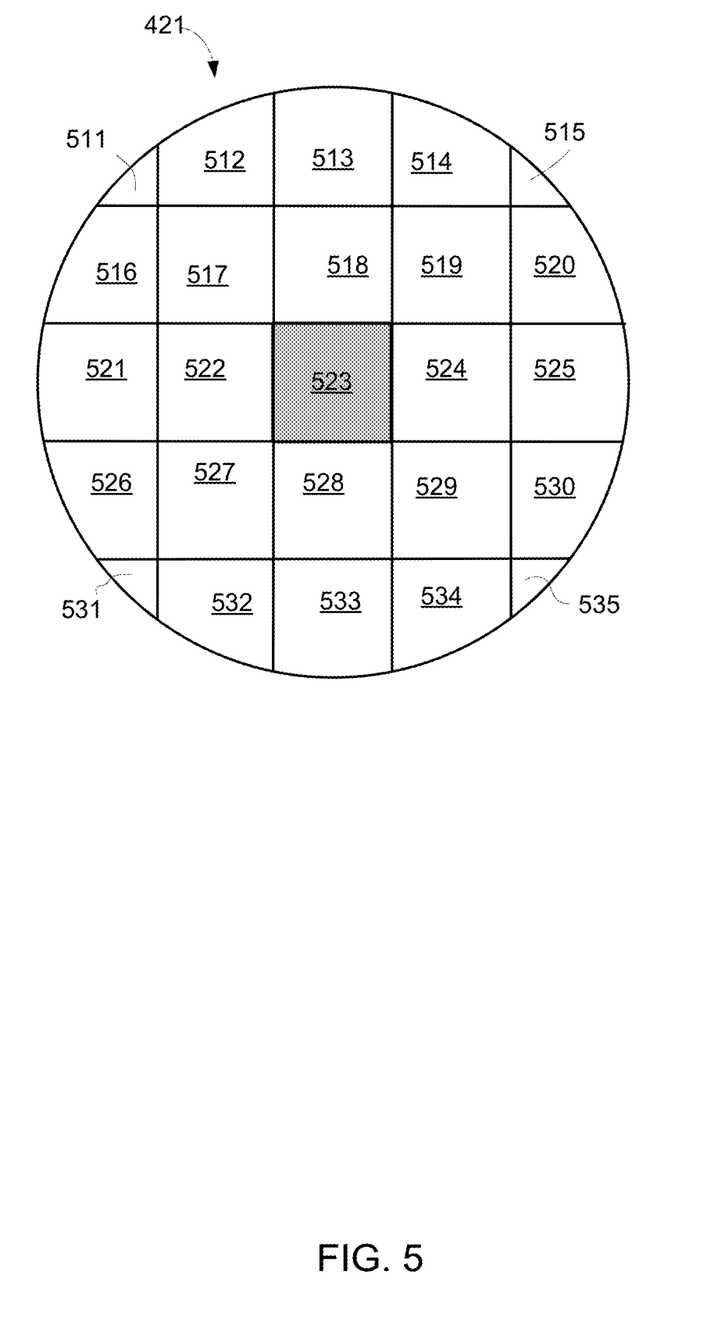
FIG. 5 illustrates an illumination of a bottom segment of a bottom of a hole by a charging electron beam according to an embodiment of the invention.

FIG. 5 illustrates bottom segment 523 that is positioned at the center of the bottom 421 of the hole that is illuminated when the charged particle beam system 310 operates at the second operational mode. It is noted that another bottom segment may be illuminated when the charged particle beam system 310 operates at the second operational mode.

Figure 6:
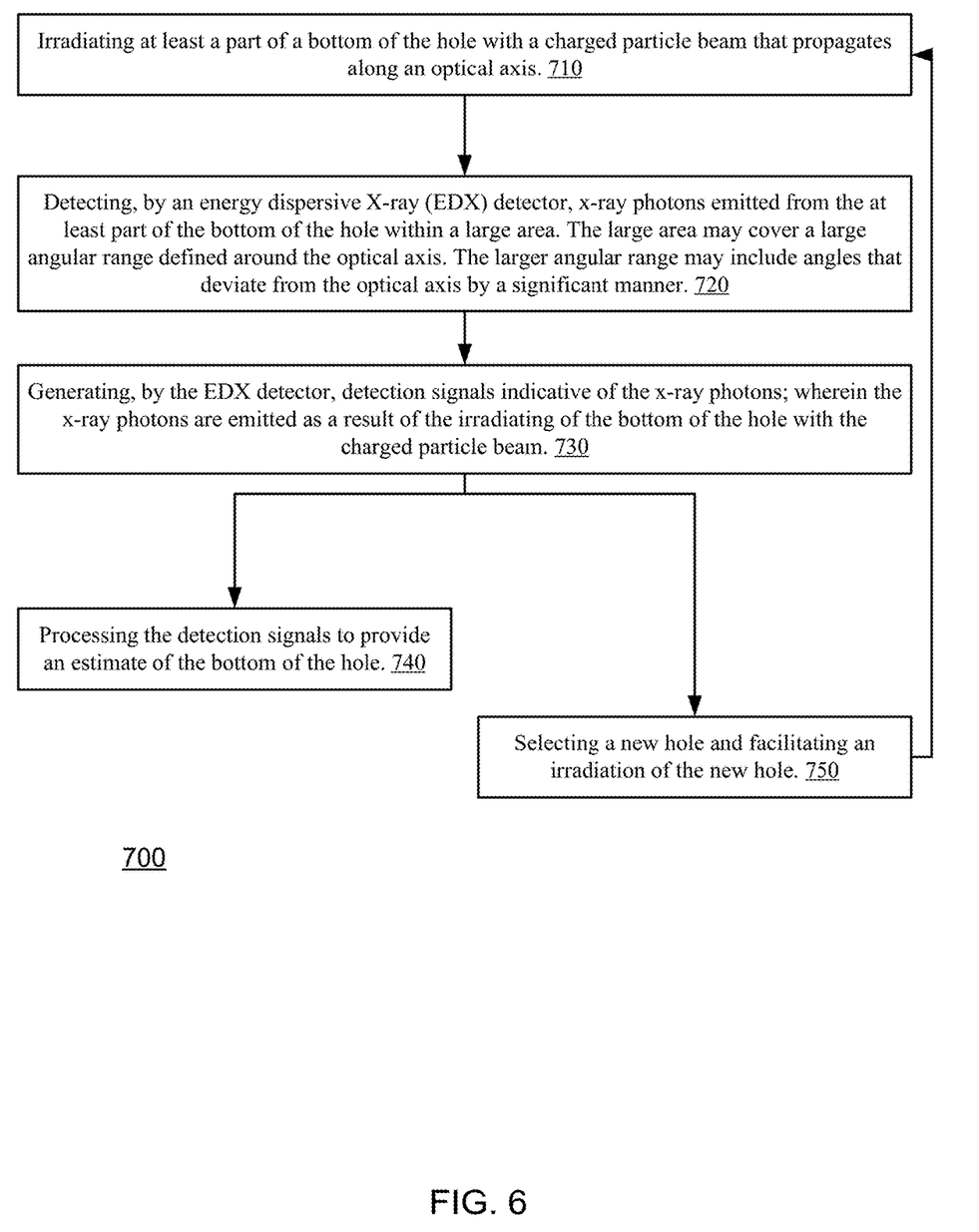
FIG. 6 is a flow chart according to an embodiment of the invention.

FIG. 6 illustrates method 700 according to an embodiment of the invention.

Method 700 may start by step 710 of irradiating at least a part of a bottom of the hole with a charged particle beam that propagates along an optical axis.

When operating in a first operational mode the bottom of the hole (or at least a majority of the bottom of the hole) is scanned.

When operating in a second operational mode only a single segment of the bottom of the hole is irradiated—without scanning.

Any portion (or fraction) of the bottom may be irradiated.

Step 710 may include directing the charged particle beam through a charged particle beam optics tip and through an aperture of tip of the EDX detector.

Step 710 may be followed by step 720 of detecting, by an energy dispersive X-ray (EDX) detector, x-ray photons emitted from the at least part of the bottom of the hole within a large area. The large area may cover a large angular range. The large angular range may or may not be defined around the optical axis. The large area may be symmetrical non-symmetrical, may include one or more lobes, or have any shape. The larger angular range may include angles that deviate from the optical axis by a significant manner, for example, the angular deviation may exceed ten degrees.

Step 720 may be followed by step 730 of generating, by the EDX detector, detection signals indicative of the x-ray photons; wherein the x-ray photons are emitted as a result of the irradiating of the bottom of the hole with the charged particle beam.

Step 730 may be followed by steps 740 and 750.

Step 740 includes processing the detection signals to provide an estimate of the bottom of the hole.

Step 750 includes selecting a new hole and facilitating an irradiation of the new hole. Step 750 may include moving the charged particle beam, adjusting the charged particle beam optics to irradiate the new hole, blanking the beam charged particle beam so that the charged particle beam will not irradiate the area between the holes, introducing a mechanical movement between the substrate and the charged particle beam optics, and the like. Step 750 may be followed by step 710.

Figure 7:
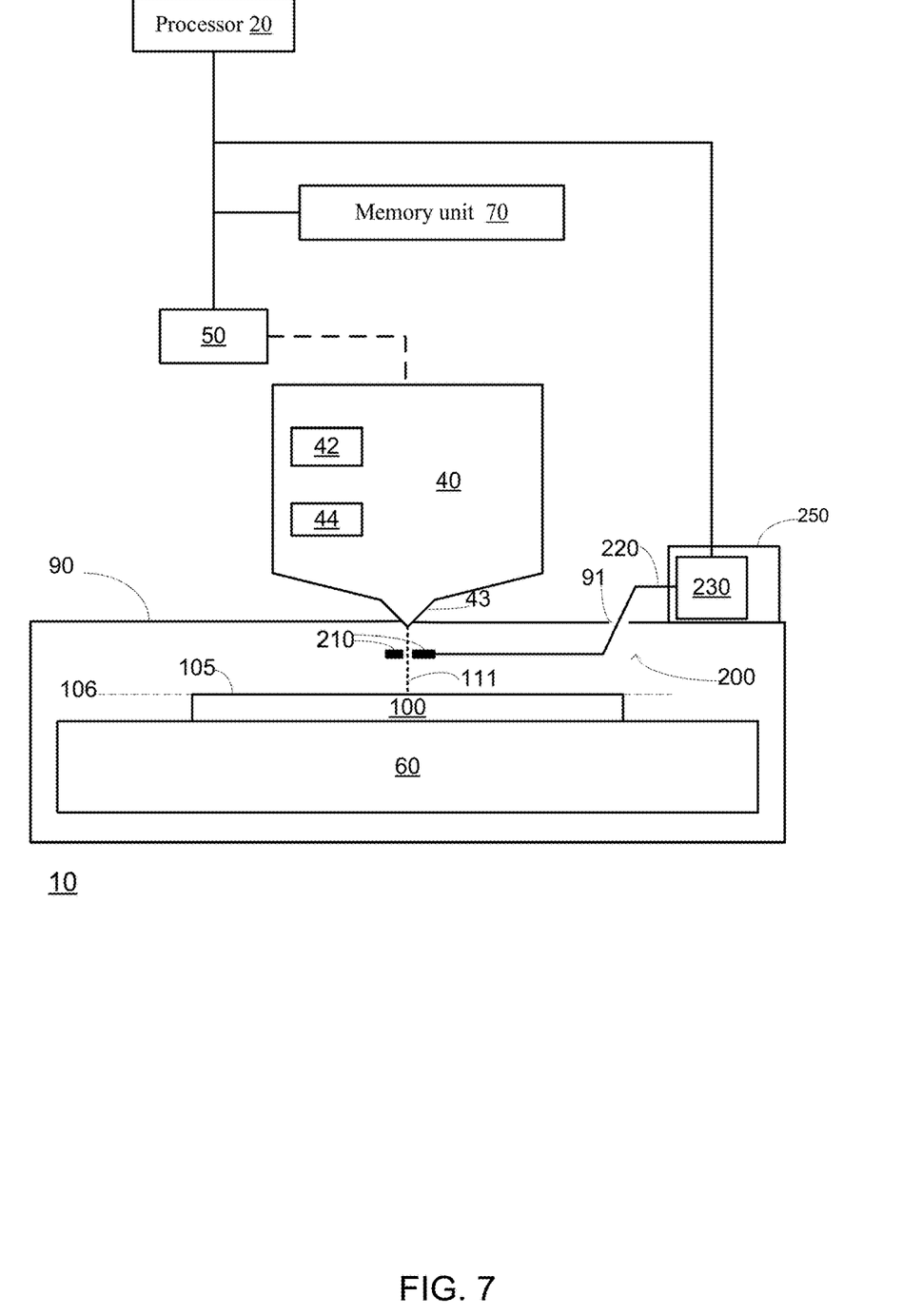
FIG. 7 illustrates a system according to an embodiment of the invention.

FIG. 7 illustrates charged particle beam system 10 and substrate 100 according to an embodiment of the invention.

Charged particle beam system 10 is illustrated as being a charged particles imager such as but not limited to a scanning electron microscope (SEM) or an electron beam charged particle beam system.

Charged particle beam system 10 includes controller 50, movable stage 60, charged particle beam optics 40, EDX detector 200, EDX detector motion module 250, substrate chamber 90, memory unit 70 and processor 20.

Controller 50 is configured to control the operation of at least some of the various components of charged particle beam system 10.

Movable stage 60 is configured to support substrate 100 and move substrate according to a mechanical scan pattern.

Charged particle beam optics 40 is configured to (a) generate a primary charged particle beam 111, (b) deflect and/or otherwise direct the primary charged particle beam 111 to exit through charged particle beam optics tip 43 to impinge on substrate 100, (c) detect electrons that are emitted from substrate.

In FIG. 1 the charged particle beam optics 40 is illustrated as including in-lens secondary electron detector 42 and in-lens backscattered electron detector 44. It is noted that charged particle beam optics 40 may include one or more electron out-lens electron detector, may have only one or more secondary electron detector, may include only one or more backscattered electron detector or may include any combination of electron detectors.

It is noted that the in-lens secondary electron detector 42 may be used when the charged particle beam system inspects areas of the substrate that are not high aspect ratio holes.

EDX detector motion module 250 is configured to move the EDX detector 200 between a first position and a second position.

Substrate 100 may be a wafer, a micro-machined object, a solar panel and the like. Substrate 100 may be relatively large (for example, have a diameter of 300 millimeters) and EDX detector, even when positioned at the second positon may be positioned directly above substrate 100.

Accordingly, the projection of the EDX detector 200 on a plane of substrate 100 virtually falls on substrate 100 when the EDX detector 200 is positioned at the first position and when the EDX detector is positioned at the second position.

EDX detector 200 includes EDX detector tip 210, EDX detector conduit 220 and EDX detector amplifier 230. FIG. 7 illustrates EDX detector 200 as being positioned in a first position in which EDX detector tip 210 is positioned between charged particle beam optics tip 43 and substrate 100. Primary charged particle beam 111 passes through an aperture formed in EDX detector tip 210. EDX detector conduit 220 passes through a substrate chamber opening 91.

When EDX detector 200 is positioned at the first position, the EDX detector tip 210 is very close (for example, few tenths of nanometers) from the substrate and thus EDX detector 200 is able to detect x-ray photons that propagate within a large angular range that EDX detectors 200 that are more distant from substrate 100.

Furthermore, when placing windows on both sides of the aperture, the EDX detector 200 may provide a symmetrical coverage of emitted x-ray photons.

Movable stage 60 may follow a mechanical scan pattern and charged particle beam optics 40 may deflect primary charged particle beam 111 thereby scanning substrate 100.

X-ray photons emitted as a result of the scanning of substrate 100 enter the window of EDX detector tip 210 and are detected by an x-ray sensitive element of the EDX detector. The x-ray sensitive element may be a photodiode. The x-ray sensitive element generates detection signals indicative of the detected x-ray photons. The detection signals are sent via EDX detector conduit 220 to EDX detector amplifier 230 and may then be stored in memory unit 70 or processed by processor 20. It is noted that the detection signals may be converted to digital detection signals by EDX detector amplifier 230 or by an analog to digital converter that does not belong to EDX detector amplifier 230.

Processor 20 may correlate or otherwise associate between points of the substrate that were illuminated (by primary charged particle beam 111) during the scanning of substrate 100 and detection signals generated by the EDX detector.

Processor 20 may be configured to evaluate compositions of the points of the substrate that were illuminated during the scanning of the substrate.

Figure 8:
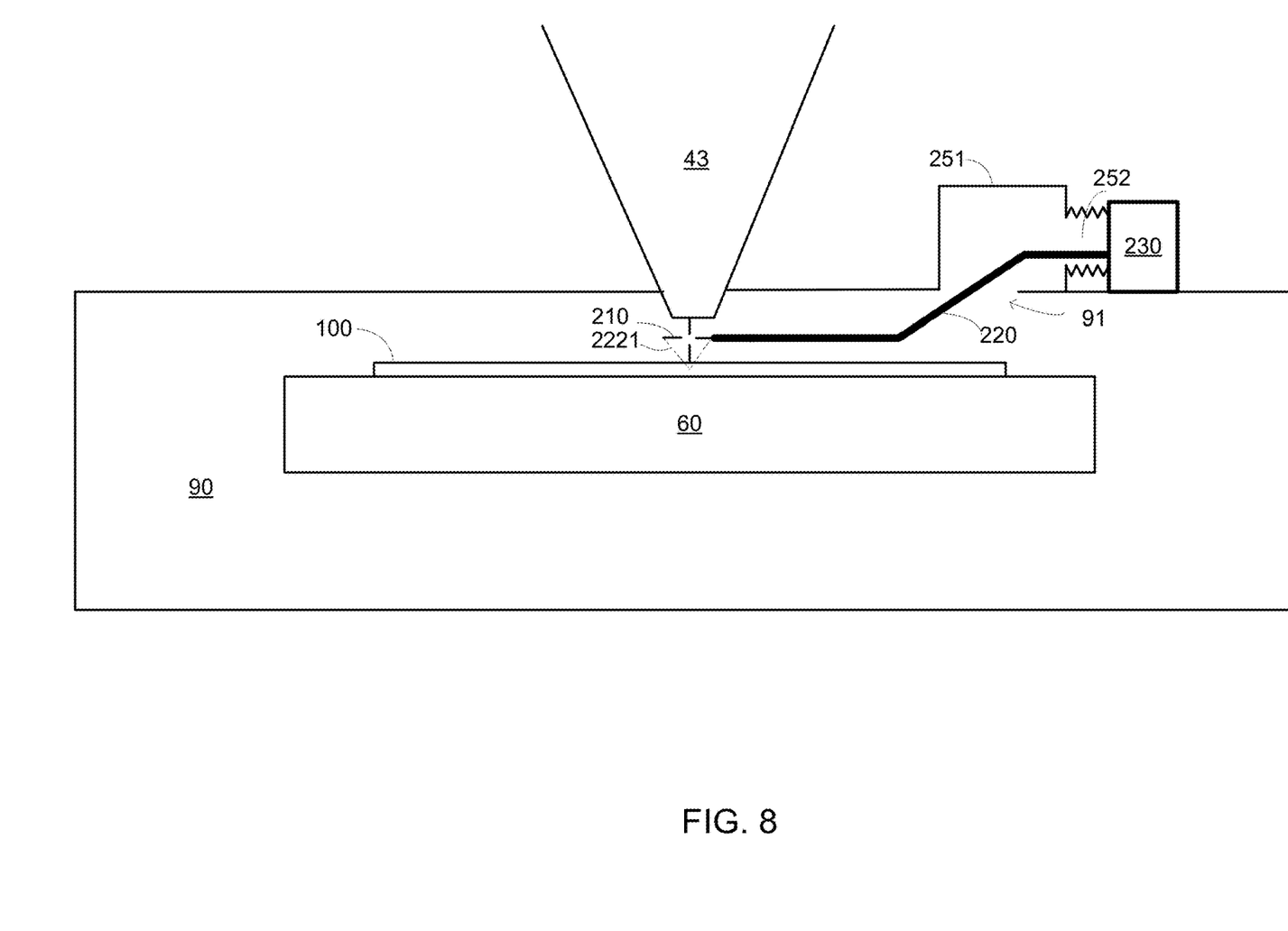
FIG. 8 illustrates a portion of a system according to an embodiment of the invention.

FIG. 8 is a cross sectional view of charged particle beam system 10 and substrate 100 according to an embodiment of the invention.

EDX detector amplifier 230 is positioned outside substrate chamber 90 and EDX detector tip 210 is positioned within substrate chamber 90—at least when EDX detector 200 is positioned at the first position.

EDX detector tip 210 is coupled to EDX detector amplifier 230 via EDX detector conduit 220. In FIG. 8 the EDX detector 200 is positioned at a first position and the primary charged particle beam passes through an aperture formed in EDX detector tip 210. FIG. 8 also illustrates the large angular range 2221, wherein x-ray photons that exit within the large angular range 2221 are detected by the EDX detector tip 210. This large angular range allows detecting most of the emitted x-ray photons are provides a reasonable throughput of about a minute per hole—when operating at the first operational mode.

EDX detector conduit 220 passes through substrate chamber opening 91.

Substrate 100 is supported by movable stage 60.

In order to maintain very low substrate chamber pressure the substrate chamber 90 should be sealed regardless of the position of the EDX detector 200.

The sealing is obtained by including a cover 251 and bellows 252 that surround EDX detector conduit 220 and seal the EDX detector conduit 220 and the substrate chamber 90 from the environment.

Bellows 252 is flexible and is connected between EDX detector amplifier 230 and cover 251.

Figure 9:
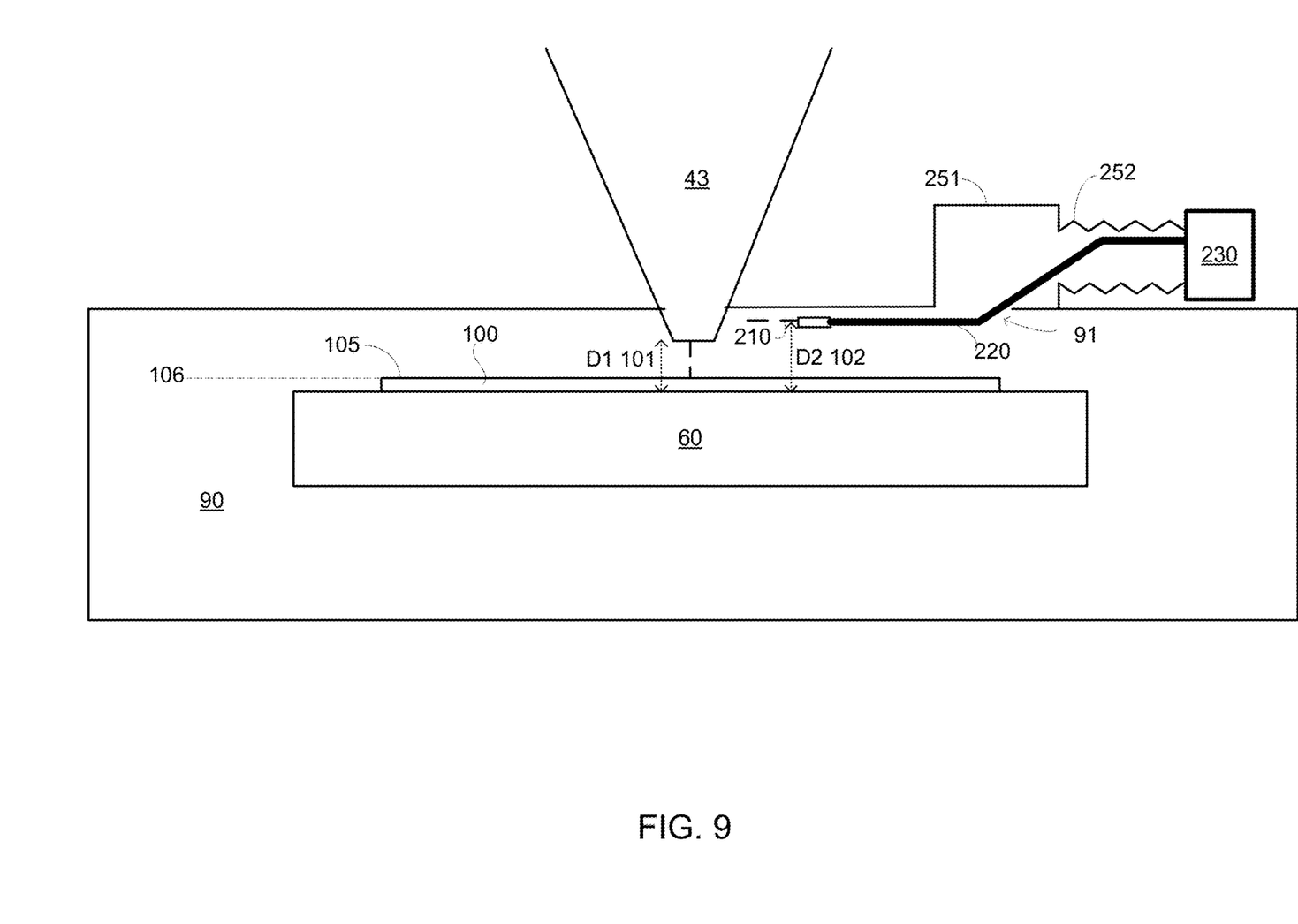
FIG. 9 illustrates a portion of a system according to an embodiment of the invention.

FIG. 9 is a cross sectional view of charged particle beam system 10 and substrate 100 according to an embodiment of the invention.

FIG. 9 illustrates EDX detector 200 as being positioned in a second position in which EDX detector tip 210 is spaced apart from the charged particle beam optics tip 43 and the substrate 100. EDX detector tip 210 does not interfere with any measurements performed by charged particle beam optics 40.

When in the second position the distance (D1 101) between EDX detector tip 210 and the movable stage 60 exceeds the distance (D2 102) between the movable stage and the charged particle beam optics tip when the EDX detector is positioned at the second position.

The EDX detector 200 can be moved in various manners between the first and second positions. For example, EDX detector 200 can be moved towards the first position by a downwards and leftward movement.

The upper surface of the substrate is denoted 105 and the plane of substrate is denoted 106.

Figure 10:
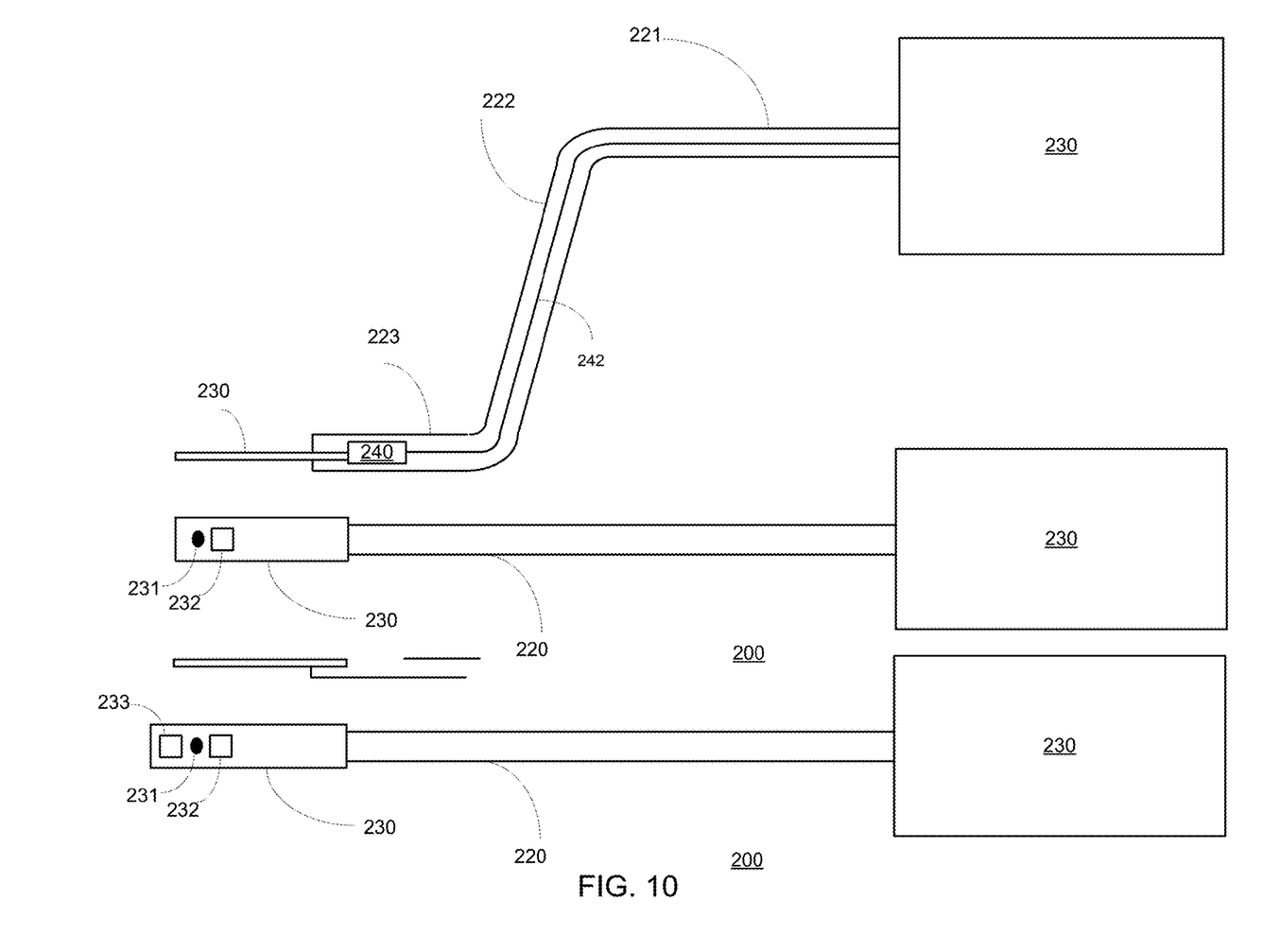
FIG. 10 illustrates top and side views of an EDX detector according to an embodiment of the invention.

FIG. 10 includes a top view and a side view of EDX detector 200 according to an embodiment of the invention.

EDX detector tip 210 is coupled to EDX detector amplifier 230 via EDX detector conduit 220.

EDX detector tip 210 is illustrates as including aperture 231 and window 232. A primary charged particle beam may pass through aperture 231 when EDX detector 200 is at a first position. X-ray photons emitted from the substrate pass through window 232 and are detected by x-ray sensitive element 240 of EDX detector 200. The x-ray sensitive element 240 may be position within EDX detector tip 210 but this is not necessarily so.

X-ray sensitive element 240 generates detection signals that are sent, via conductor 242 to EDX detector amplifier 230.

EDX detector conduit 220 is illustrated as including upper horizontal portion 221, lower horizontal portion 223 and sloped intermediate portion 222 that is connected between the upper horizontal portion 221 and the lower horizontal portion 223.

EDX detector conduit 220 may be rigid or elastic. EDX detector conduit 220 may have any shape or size.

FIG. 10 also illustrates an alternative configuration of EDX detector tip 210—that includes multiple windows 232 and 233 that are arranged in a symmetrical manner on both sides of aperture 231.

Figure 11:
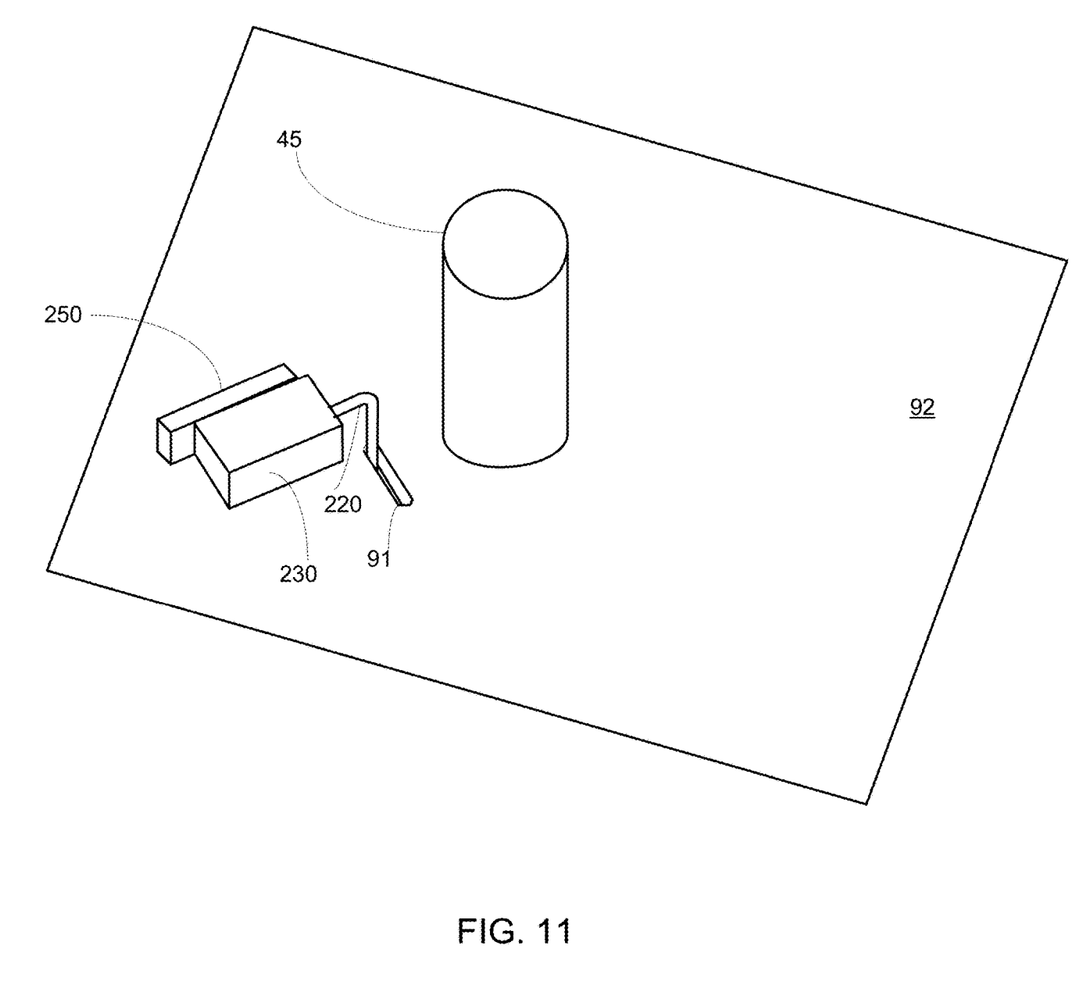
FIG. 11 illustrates an upper facet of substrate chamber and various components according to an embodiment of the invention.

FIG. 11 illustrates an upper facet 92 of substrate chamber, EDX detector motion module 250, EDX detector amplifier 230, EDX detector conduit 220, substrate chamber opening 91 and a column 45 of charged particle beam optics 40 according to an embodiment of the invention.

In FIG. 11 the EDX detector 200 is in a first position. Cover 251 and bellows 252 are not shown for simplicity of explanation.

EDX detector motion module 250 contacts the EDX detector amplifier 230 and moves EDX detector amplifier 230 in order to change the position of EDX detector 200.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for evaluating a bottom of a hole formed in a medium, the method comprising:
   irradiating a fraction of the bottom of the hole with a charged particle beam that propagates along an optical axis;
   detecting, by an energy dispersive X-ray (EDX) detector, emitted x-ray photons that are emitted, as result of the irradiating the bottom of the hole, from the bottom of the hole within an angular range that exceeds ten degrees;
   generating, by the EDX detector, detection signals indicative of the emitted x-ray photons;
   processing the detection signals to provide an estimate of the bottom of the hole; and
   repeating, for each hole of a group of holes that are formed in the medium, the steps of irradiating only a fraction of the bottom of the hole.

2. The method according to claim 1 wherein the irradiating of the bottom of the hole comprises directing the charged particle beam through a charged particle beam optics tip and through an aperture of tip of the EDX detector.

3. The method according to claim 1 wherein the irradiating of the bottom of the hole comprises irradiating at least a majority of the bottom of the hole.

4. The method according to claim 1 wherein the irradiating of the bottom of the hole comprises scanning at least a majority of the bottom of the hole with the charged particle beam.

5. A method for evaluating a bottom of a hole formed in a medium, the method comprising:
   irradiating the bottom of the hole with a charged particle beam that propagates along an optical axis;
   detecting, by an energy dispersive X-ray (EDX) detector, emitted x-ray photons that are emitted, as result of the irradiating the bottom of the hole, from the bottom of the hole within an angular range that exceeds ten degrees;
   generating, by the EDX detector, detection signals indicative of the emitted x-ray photons; and
   processing the detection signals to provide an estimate of the bottom of the hole;
   wherein when operating in a first operational mode then scanning at least a majority of the bottom of the hole with the charged particle beam and wherein when operating in a second operational mode the irradiating only a fraction of the bottom of the hole.

6. The method according to claim 1 wherein the angular range is centered about the optical axis.

7. A system for evaluating a bottom of a hole formed in a medium, wherein the system comprises:
   charged particle optics configured to irradiate the bottom of the hole with a charged particle beam that propagates along an optical axis;
   an energy dispersive X-ray (EDX) detector configured to detect emitted x-ray photons that are emitted from the bottom of the hole within an angular range that exceeds ten degrees and to generate detection signals indicative of the emitted x-ray photons; and
   a processor configured to process the detection signals to provide an estimate of the bottom of the hole;
   wherein the charged particle optics are configured to irradiate, for each hole of a group of holes that are formed in the medium, only a fraction of the bottom of the hole.

8. The system according to claim 7 wherein the charged particle optics is configured to irradiate the bottom of the hole by directing the charged particle beam through a charged particle beam optics tip and through an aperture of tip of the EDX detector.

9. The system according to claim 7 wherein the charged particle optics are configured to irradiate at least a majority of the bottom of the hole.

10. The system according to claim 7 wherein the charged particle optics are configured to scan at least a majority of the bottom of the hole with the charged particle beam.

11. The system according to claim 7 wherein the charged particle optics are configured to irradiate a fraction of the bottom of the hole.

12. A system for evaluating a bottom of a hole formed in a medium, wherein the system comprises:
- charged particle optics configured to irradiate the bottom of the hole with a charged particle beam that propagates along an optical axis;
- an energy dispersive X-ray (EDX) detector configured to detect emitted x-ray photons that are emitted from the bottom of the hole within an angular range that exceeds ten degrees and to generate detection signals indicative of the emitted x-ray photons; and
- a processor configured to process the detection signals to provide an estimate of the bottom of the hole;
- wherein the charged particle optics are configured to scan, when operating in a first operational mode, at least a majority of the bottom of the hole with the charged particle beam; and wherein the charged particle optics is configured to irradiate, when operating in a second operational mode, only a fraction of the bottom of the hole.

* * * * *